United States Patent Office 3,291,567
Patented Dec. 13, 1966

3,291,567
PROCESS FOR PREPARING SUPEROXIDES
Carey B. Jackson, Pompano Beach, Fla., assignor, by mesne assignments, to Scott Aviation Corporation, Lancaster, N.Y., a corporation of New York
No Drawing. Filed Aug. 26, 1964, Ser. No. 392,292
4 Claims. (Cl. 23—187)

This is a continuation-in-part of my copending patent application Serial No. 267,840, filed March 25, 1963.

The present invention relates to alkaline earth metal superoxides and more specifically to an improved method of preparing metal superoxides such as calcium superoxide ($CaO_4$) and other Group IIa metal superoxides.

The superoxide of potassium ($KO_2$) has been manufactured commercially for many years and has found use as an oxygen source as well as a carbon dioxide (acid gas) absorbent (cf. Jackson Patent No. 2,405,580). In self-contained breathing apparatus it furnishes a demand-regulated supply of oxygen along with removal of the exhaled carbon dioxide. $KO_2$ has theoretical available oxygen capacity of 236 cc. per gram and a theoretical available $CO_2$ absorptive capacity of 157 cc. per gram going to carbonate and of 314 cc. per gram to bicarbonate.

Calcium superoxide has not yet been prepared by commercially attractive means. Considering the atomic weight (40) of calcium, along with its divalent nature, the availability of $CaO_4$ for use as noted above would be extremely important. Contrasted to the superoxide of potassium (atomic weight 39.1) $CaO_4$, for example, will theoretically have an available oxygen content of 323 cc. per gram and a basicity equivalent to 215 cc. of carbon dioxide per gram going to the carbonate.

Attempts to prepare $CaO_4$ have centered around the reaction between CaO and aqueous hydrogen peroxide, illustrated as follows:

$$CaO + 3H_2O_2 \rightleftharpoons CaO_4 + 3H_2O$$

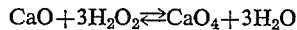

The removal of the water has posed problems and to the best of the available information, this reaction has resulted in yields of some low purity $CaO_4$.

In view of, among other things, the problem of water removal inherent in the use of hydrogen peroxide, investigations were carried out searching for an improved method of making superoxides in a water-free system. During these investigations it was discovered that the superoxides could be prepared by the ozonation of alkaline earth metal oxides, usually in the presence of an alkali metal compound catalyst or ozone carrier, with subsequent thermal decomposition of the resulting alkaline earth metal ozonide to the superoxide.

The alkaline earth metal starting material should be substantially free of water at the start of the ozonation treatment. For example, lime may be dried by passage therethrough of an inert gas at a temperature higher than about 100° C., say even about 400°–500° C. Also, traces of water in CaO may be removed by mixing, with this starting material, alkali metal in the form of an oxide, such as the peroxides $Na_2O_2$ or $K_2O_2$ which absorb the moisture, reverting to the hydroxide form. Also, Group IIa metal oxides may be obtained from salts such as the nitrate in a dry, more or less "nascent" state, by contact with dry oxygen, ozone or mixtures of the same, thus thermally decomposing the metal nitrate to the corresponding oxide in situ in the oxidizing gas. Where ozone is used, this treatment can be continued to give the ozonide.

The alkali metal compound is present usually as the hydroxide, but may be added to the alkaline earth metal oxide, nitrate, etc. as another form which reverts to the hydroxide during the initial stages of the treatment. As mentioned, the peroxides are often used, as may be also the oxides. Enough of the alkali metal oxide or hydroxide is employed to give a catalytic effect, say about 0.1 to 10% by weight of the reaction mass, preferably about 0.5 to 6%.

The ozone may be supplied by any convenient means and in a concentration suitable for the desired conversion to oxonide. Usually the ozone is supplied as an about 1 to 5% concentration in oxygen, e.g. about 3%. This gas mixture is readily obtained by passing relatively pure oxygen through an electric arc. Since the instability of ozone increases at higher temperatures and is quite pronounced at above about 100° C., ambient temperature is often chosen for the reaction to form ozonide. The gas should be substantially anhydrous.

The ozonide is decomposed to alkaline earth metal superoxide by a gentle treatment with oxygen at a slightly elevated temperature. Usually the temperature should be kept below 100° C. The oxygen may be diluted with inert gases, but the presence of nitrogen should be avoided to obviate nitride formation. The end of the reaction is often signaled by a color change in the treated solid. For example, calcium superoxide is yellow.

The following examples will serve to illustrate the invention.

*Example I*

About 10 grams of dry commercially obtained calcium oxide is mixed with 0.5 gram KOH and heated to about 400–500° C. to thoroughly dry it by passing oxygen through it. After cooling, the powder was subjected to a stream of dry 3% ozone for about two hours at room temperature. At this time the reaction mixture, containing calcium ozonide is subjected to a stream of dry oxygen and the temperature is raised to about 100° C. After about one hour the reaction mixture is cooled and the resulting calcium superoxide is recovered and maintained free from moisture.

*Example II*

About 100 grams of calcium nitrate mixed with about 1 gram $Na_2O_2$ is first heated to about 350°–400° C. in flowing oxygen for several minutes. The dry calcium nitrate is then allowed to cool and is subjected to a stream of a dry 3% ozone-oxygen mixture at room temperature. After about two hours the resulting calcium ozonide is subjected to oxygen at about 60°–80° C. and the calcium superoxide is recovered.

Other alkaline earth metal superoxides can be prepared in accordance with the examples with the optimum operating conditions, including temperatures and times, being ascertained by preliminary test.

What is claimed is:
1. The method of preparing an alkaline earth metal superoxide which comprises contacting a dry alkaline earth metal oxide at temperatures from ambient up to below about 100° C. with dry ozone and then thermally decomposing the resulting metal ozonide in dry oxygen to form the superoxide.

2. The method of claim 1 in which the ozonation takes place in the presence of an alkali metal hydroxide.

3. The method of claim 1 in which the alkaline earth metal is calcium.

4. The improved method of preparing calcium superoxide which comprises thermally decomposing calcium nitrate in the presence of dry ozone and then thermally decomposing the resulting calcium ozonide to calcium superoxide in dry oxygen.

References Cited by the Examiner

UNITED STATES PATENTS 3,139,327  6/1930  Marshall et al. _____ 23—184

FOREIGN PATENTS 8,503  of 1911  Great Britain.

OTHER REFERENCES

Mellor: Comprehensive Treatise on Inorganic and Theoretical Chemistry, Longmans, Green and Co., New York, 1923, vols. II and III.

OSCAR R. VERTIZ, *Primary Examiner.*

J. J. BROWN, *Assistant Examiner.*